United States Patent [19]

Otto et al.

[11] Patent Number: 5,060,086
[45] Date of Patent: Oct. 22, 1991

[54] APPARATUS FOR ASSEMBLING OF VIDEO TAPES

[75] Inventors: Wolf-Rüdiger Otto, Elmshorn; Joachim Behrens, Hamburg, both of Fed. Rep. of Germany

[73] Assignee: W. Steenbeck & Co. (GmbH & Co.), Hamburg, Fed. Rep. of Germany

[21] Appl. No.: 311,224

[22] Filed: Feb. 15, 1989

Related U.S. Application Data

[63] Continuation-in-part of Ser. No. 948,466, Dec. 29, 1986, abandoned, which is a continuation of Ser. No. 550,592, Nov. 9, 1983, abandoned.

[51] Int. Cl.$^5$ .................... G11B 27/02; H04N 5/76
[52] U.S. Cl. .................... 360/14.1; 360/73.02; 358/335
[58] Field of Search ............ 358/335, 244, 244.1, 358/244.2, 346, 398; 369/69, 70; 360/14.1–14.3, 13, 15, 73.02, 79, 80, 72.2, 74.4

[56] References Cited

U.S. PATENT DOCUMENTS

| | | | |
|---|---|---|---|
| 3,026,369 | 3/1962 | Lohmann et al. | 360/14.1 |
| 3,230,307 | 1/1966 | Bounsall | 360/14.2 X |
| 3,506,965 | 4/1970 | Dowling et al. | 358/335 X |
| 3,938,189 | 2/1976 | Goldmark | 360/73.02 X |
| 4,067,049 | 1/1978 | Kelly et al. | 360/13 X |
| 4,214,278 | 7/1980 | Hunt et al. | 360/14.1 |
| 4,363,048 | 12/1982 | Tanaka et al. | 360/14.1 X |
| 4,428,001 | 1/1984 | Yamamura et al. | 360/14.1 X |
| 4,491,879 | 1/1985 | Fine | 360/13 X |
| 4,538,188 | 8/1985 | Barker et al. | 360/14.3 |
| 4,675,757 | 6/1987 | Block | 360/14.3 X |

*Primary Examiner*—David Trafton
*Assistant Examiner*—Joseph A. Rhoa
*Attorney, Agent, or Firm*—Michael J. Striker

[57] ABSTRACT

An apparatus for assembling a video tape has a video tape drive, at least one sound track drive, and a drive coupled connection to provide a synchronous run between the drives under all operational conditions inclusive of standstill, positive acceleration, uniform tape speed and negative acceleration. To compensate for slip of the video tape, there is provided a closed-loop controller for the drive coupled connection.

4 Claims, 5 Drawing Sheets

APPARATUS FOR ASSEMBLING OF VIDEO TAPES

CROSS-REFERENCE TO RELATED APPLICATIONS

This is a continuation-in-part of application Ser. No. 948,466 filed Dec. 29, 1986, now abandoned which in turn is a continuation application of Ser. No. 550,592, filed Nov. 9, 1983, now abandoned.

BACKGROUND OF THE INVENTION

The invention relates to an apparatus for assembling on video tapes information retrieved from separate sound and/or image tracks.

For a long time, devices have been known which are combined under the common term image and sound editing tables and are provided to view one or more separate film tapes or to listen to one or more separate sound tapes and render it possible to associate or to combine these tapes in any desired manner. The processing on these known image and sound editing tables is usually preceded by the recording of the image with a camera and the simultaneous but separate recording of the corresponding sound with a conventional sound recording device. The image recorded by the film camera on a film image carrier and the sound recorded separately on a magnetic tape carrier were suitably synchronized one with the other on the image and sound editing table after the development of the film image carrier.

An especially important feature has to be met by these known editing devices in that a maximum synchronism has to be obtained between the film tape and the sound tape during the normal run with constant velocity as well as upon an accelerated run, so that the slip between the two tapes can be kept to a negligible minimum. For obtaining of the synchronism in all operational states, it has been proven especially advantageous that the transport perforation of the conventional film tape material could be used as a reference for determining the tape position relative to the other tape and depending therefrom controlling the tape drives such as to restore their synchronism, if necessary.

However, in addition to the recording technique with mechanical cameras using a conventional film tape, a different method for recording has emerged, namely the recording of images with the so-called video cameras. In a totally different way to the photographic film recording materials known so far, the images taken by a video camera are recorded on a magnetic tape which has a basic structure similar to that of the known magnetic tapes for the recording of sound. A distinguishing feature of the video tapes used for recording of images with video cameras resides in the fact that they are usually without any transport perforations, in contrast to conventional film tape material for use in mechanical cameras. If, for example, the recorded video tapes should be combined or assembled with other video tapes or with one or more other sound recordings made on conventional sound tapes, a highly accurate synchronism between the individual tapes in all operational states thereof constitutes an unalterable requirement for the practical usability of the device used as an image and sound editing table.

For guaranteeing an accurate synchronism between one or more video tapes as well as of one or more sound tapes and one or more separate image tapes, extremely expensive measures have hitherto been used. These known measures have been based on purely electronic systems operating with devices arranged at locations remote from the actual image and sound editing table. Furthermore, these known systems are extremely complicated to operate and may lead to considerable inaccuracies between the timing of individual tapes, namely the so-called static and/or dynamic dephasings. The operation of such complex image and sound editing tables provided with external electronic systems is considerably different from the working with conventional image and sound editing tables using classical working methods. Consequently, the operation can be performed with specially trained personnel only, under abandonment of the conventional working methods.

SUMMARY OF THE INVENTION

It is a general object of the present invention to avoid the above discussed disadvantages of prior art editing tables.

In particular, it is an object of the present invention to provide an editing apparatus which uses a video tape as an image carrier and provides a highly accurate synchronism relative to one or more separate sound tapes and/or one or more separate image tapes.

Still another object of the present invention is to provide an apparatus for editing video tapes which allows the use of classical working methods for image and sound editing, namely the methods used for editing conventional, chemically recorded film tapes.

A concomitant object of the invention is to provide an apparatus for assembling video tapes which is simple in construction, reliable in operation and inexpensive in manufacture.

In keeping with these objects and with others which will become apparent hereinafter, one feature of the invention resides in an apparatus for assembling a video tape, which apparatus comprises means for driving the video tape, means for driving at least one separate sound track or tape, and means for providing a drive coupled connection between the driving means for the video tape and the driving means for the sound track, and a closed-loop controller for the connection providing means to obtain a synchronism between the video tape and the sound track.

Through the provision of the closed-loop control for the drive coupled connection, separate electronic synchronizing devices for controlling the driving means for the video tape and for controlling the separate driving means for the sound track can be omitted. The drive coupled connection is arranged within the editing apparatus, that is in the actual image and sound editing table so that other, additionally operated synchronizing units externally associated with the apparatus can be dispensed with, so that the conventional working steps are maintained when operating the image and sound editing table of this invention. Preferably, the apparatus is so constructed that additional driving means for a separate image track can be also drive coupled with the driving means for the video tape. Regardless whether the tape material used for the separate image track or image tracks is provided with a drive perforation or not, the drive coupled connection of this invention guarantees a highly accurate synchronism between all information carriers.

According to a further advantageous feature, the drive coupled connection is developed such that the driving means for the separate sound track as well as the driving means for the separate image track are drive coupled in combination with each other and with the driving means for the video tape. This feature is especially suitable when the sound track and the image track are to be mixed on a single information carrier, or when a separate sound track and a separate image track must be operated and synchronized relative to each other and relative to the driving means for the video tape.

The drive coupled connection between the individual track drives can be developed in different ways using known measures. Preferably, the drive coupled connection can be realized by a mechanical connection which has the advantage of a relatively simple construction so that a considerable reduction of expenses is obtained, and the possibility of an asynchronism between the individual track drives is minimized. In case the mechanical connection between the track drives is rigid, which for example can be achieved by a single common drive shaft for all track drives, the possibility of an asynchronism between the individual drives of the respective tracks relative to each other is practically eliminated. The rigid mechanical connection which is very simple and nevertheless highly effective is especially suitable when the image and sound editing table according to the invention is considerably in use and designed in a robust manner to guarantee reliable performance.

Despite the very good synchronism obtained with the editing apparatus according to the invention between the individual drives for the respective tape tracks, under certain operational conditions, the occurrence of a slip drives cannot be precluded. Therefore, the drive coupled connection is provided with an electromechanical slip compensation arrangement. In accordance with another feature of the invention, the drive coupled connection is controlled by an electronic slip compensating arrangement.

In some cases, especially when the slip compensation based on mechanical measures such as for example on the use of a differential gear is not sufficient, it is of advantage to provide the drive coupled connection with a combination of an electronic and a mechanical slip compensation arrangement. While the actual compensation of the slip for providing a synchronism is obtained by a mechanical correcting element, the detection of the slip and the subsequent generation of respective correction signals supplied to a correcting element for the compensation of the slip, is achieved with electronic means which have a very short response time when used in this manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
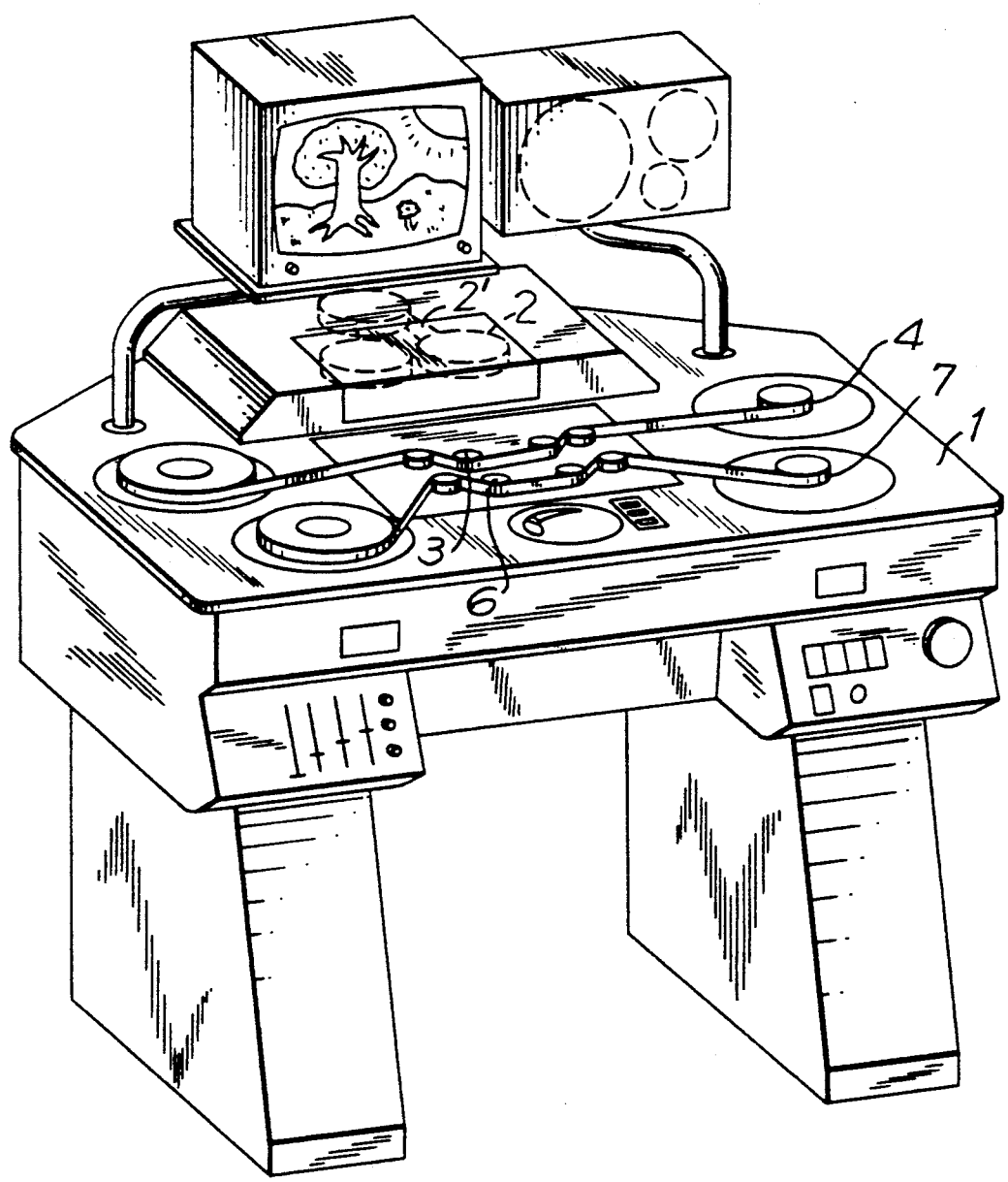
FIG. 1 is a schematic perspective illustration of the editing apparatus according to the invention with a device for driving the video tape as well as two separate driving devices for picture/sound film tapes.

Referring to FIG. 1, the apparatus for editing or assembling of video tapes is illustrated in the form of an image and sound editing table 1. It is conceivable that the apparatus according to the invention can also be used in projectors or in recording and playback devices as long as an accurate synchronism between separate tracks is of relevance.

The embodiment of apparatus 1 includes an arrangement 2 for driving the video tape, an arrangement 3 for driving a separate sound track 4, and an arrangement 6 for driving a separate image track 7. The driving arrangement 2 usually includes a capstan-type drive mechanism. The image track 7 can be developed as a separate sound track, while the separate sound track 4 can be developed as a separate image track. Although in the present embodiment only two separate tracks 4, 7 are illustrated in addition to the track formed by the video tape, it is to be noted that the number of the separate tracks is arbitrarily increasable. Furthermore, the apparatus 1 includes operating and input elements for the control of the entire editing process, as well as viewing devices for visually monitoring image information being recorded on the video tapes, and loudspeakers and amplifiers for replaying sound recorded on audio films.

Figure 2:
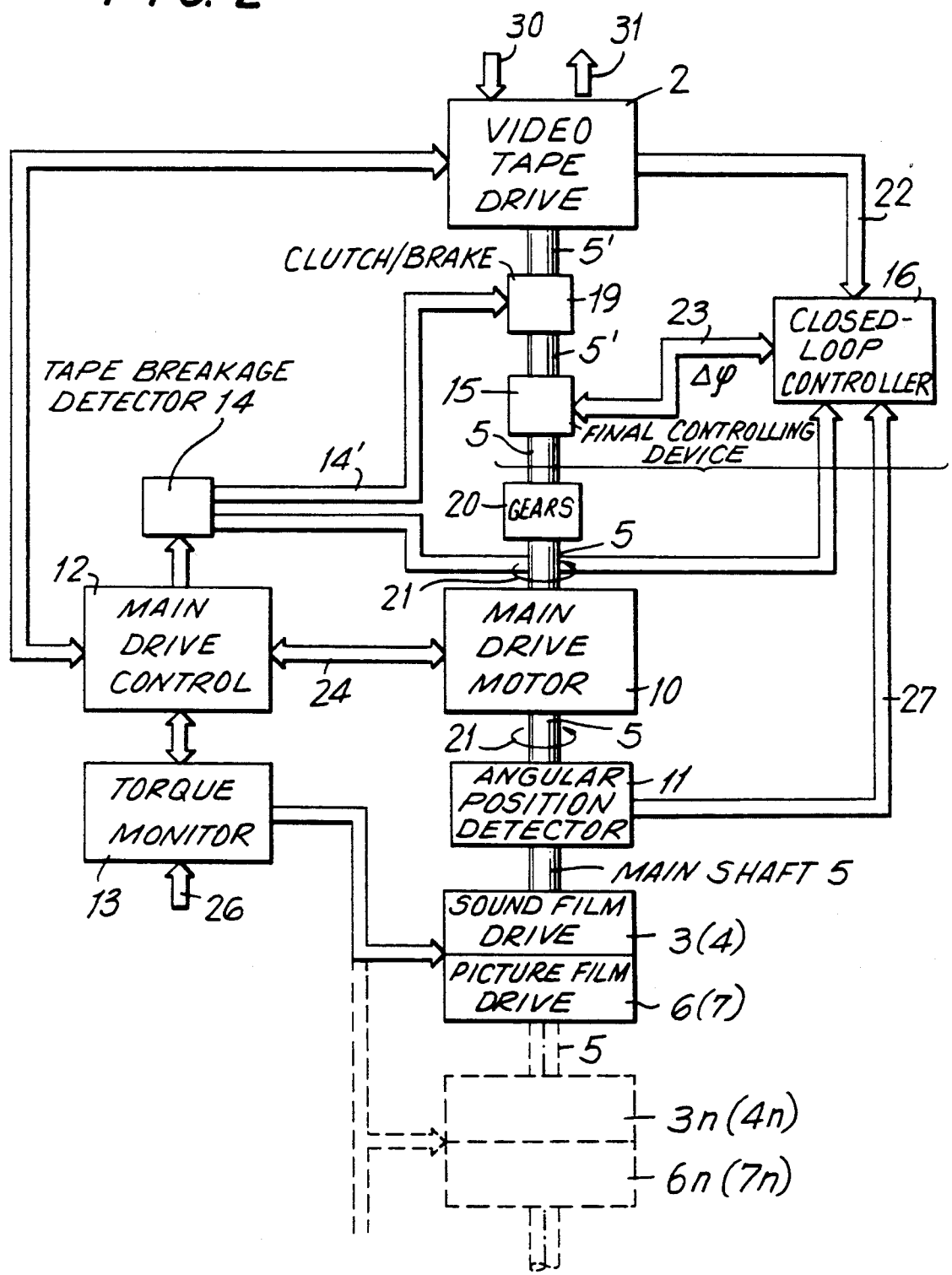
FIG. 2 shows a schematic illustration of an embodiment of the invention having a continuous mechanical connection between the driving devices for the individual tapes processed in the apparatus, as well as a block circuit diagram of control and operating means for the mechanical connection.

FIG. 2 shows the mechanical structure and interconnections of the individual components of the apparatus 1 for providing the accurate synchronism between the individual tape tracks.

The apparatus includes the arrangement 2 for driving a video tape, a main drive unit 10, an arrangement 3 for driving the separate sound track 4, and an arrangement 6 for driving the separate image track 7. In the embodiment of FIG. 2, the arrangement 2 for driving the video tape is connected to the arrangement 3 for driving the separate sound track 4 and to the arrangement 6 for driving the separate image track 7 via the main drive unit 10 and the drive coupled connection 5. The connection 5 thus provides the desired synchronism for all components driven in the apparatus 1.

The drive coupled connection 5 in this example is basically a rigid mechanical connection which can be in the form of a rotating shaft driven by the main drive unit 10. Arrows 21 indicate the rotational movement of the shaft 5.

To this basic structure, a combination of additional control components may be added which, however, by using non-rigid mechanical connections to the individual drives, must be electrically controlled in order to obtain the synchronism. This combination includes essentially a clutch/brake device 19 which is arranged in the connection 5 between the arrangement 2 for driving of the video tape and the main drive unit 10, a tape breakage detector 14 and a torque monitor 13. The devices 13 and 14 are not in a direct engagement with the drive coupled connection 5.

To provide the requisite electrical control, the apparatus 1 has an actuator which is developed as a final controlling device 15, and cooperates with a closed-loop controller 16. The final controlling device 15 and the controller 16 together form a slip compensating unit for the compensation of any asynchronism which may occur between the tracks. The devices 15, 16 can either be an electromechanical slip compensation unit 8 (FIG. 4) or an electronic slip compensation unit 9 (FIG. 5) or a combination of both.

The mechanical connection constituting the drive coupled connection 5 may include a gear arrangement or a timing belt arrangement, or a combination of both. Further the drive coupled connection 5 can be associated with an intermediate transmission gear 20 located between the arrangement 2 for driving the video tape and the main drive unit 10. The gear 20 has a fixed transmission ratio and serves for adapting the rotation of the capstan-type drive 2 to that of the separate picture or sound film drives.

Between the main drive unit 10 and the arrangement 3 for driving the separate sound track 4 and the arrangement 6 for driving the separate picture film drive 7, an incremental angular position detector 11 operates in association with the main shaft or connection 5 to transmit to controller 16 information on the angular position of the connection 5.

As indicated by the dotted line in FIG. 2, the apparatus 1 can be equipped not only with a single driving arrangement 3 for driving the separate sound track 4 and a single arrangement 6 for driving the separate image track 7 but can contain an arbitrary number n of such driving arrangements. This is symbolically indicated by reference numeral 3n referring to the additional arrangements for driving the separate sound tracks 4n, and by reference numeral 6n referring to the arrangements for driving the separate image tracks 7n.

In addition to the components of the apparatus 1 which cooperate directly with the drive coupled connection 5, the apparatus further includes a main drive control 12 which controls the main drive 10 in response to signals generated by the torque monitor 13 assigned to the separate sprocket-type sound film- and picture film drives 3, 3n and 6, 6n. Arrow 24 represents the cloosed-loop between the drive control 12 and the main drive 10. Arrow 26 indicates that external control signals, for example speed or direction setting signals, can be fed into the main drive control 12 through the torque monitor 13.

For compensating a slip between the arrangement 2 and the separate sound track 4 and/or the separate image track 7 and/or the separate sound track 4n, and-/or the separate image track 7n, respectively, synchronization pulses 22 transmitted by video tape drive 2 or other synchronization pulses sensed by corresponding tape position sensor CTL (FIGS. 4 and 5) are processed by controller 16 together with pulses 27 representing the desired video tape position value which is connected to one or more film drives 3, 3n and 6, 6n, respectively, so that the difference between the position of the video tape 2' in the arrangement 2 and the angular position of drives 3, 3n and 6, 6n is kept to a minimum. The accurate synchronization is obtained under all operational conditions of respective drives, i.e. in standstill, under a positive or negative acceleration, and at a uniform tape speed.

In the embodiment as described in FIG. 2, the main drive unit 10 imparts through the drive coupled connection 5 driving motion to all separate film drives (via respective arrangements 3, 6) as well as to the capstan arrangement 2 for driving the video tape 2'. The main drive unit 10 may consist of one or more driving motors. The intermediate transmission gear 20, as mentioned before, is provided for adapting the rotation ratio between the driving arrangement 2 for the video tape and the driving arrangements 3 to 3n and 6 to 6n for driving the separate sound film tapes 4 to 4n, and the separate picture film tapes 7 to 7n so as to guarantee that corresponding lengths of video tape and picture/sound film tapes are transported. Arrangement 14 for detecting tape breakage or jam triggers a signal which upon detection of video tape breakage or jam immediate stops the tape by disengaging the brake/clutch combination 19.

The driving arrangement 2, which is the actual video tape driving mechanism, is connected with outer components of the apparatus 1, for example with a picture monitor 28, sound amplifiers and sound mixing units as well as loudspeaker devices 29, as shown in FIG. 1, as well with a video camera, for example.

Figure 4:
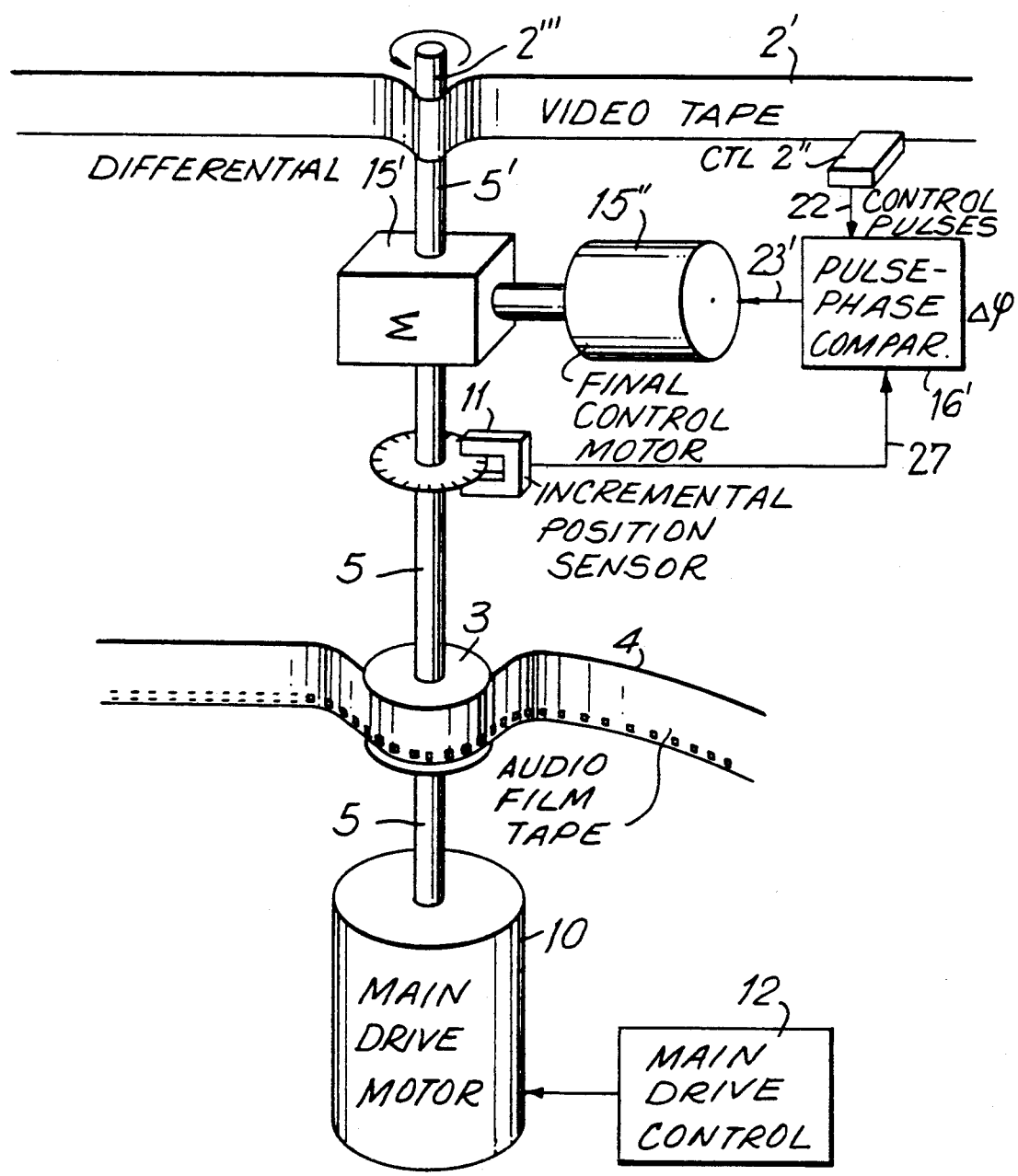
FIG. 4 is a schematic perspective view of an exemplary embodiment of an electromechanical slip compensating arrangement.
Figure 5:
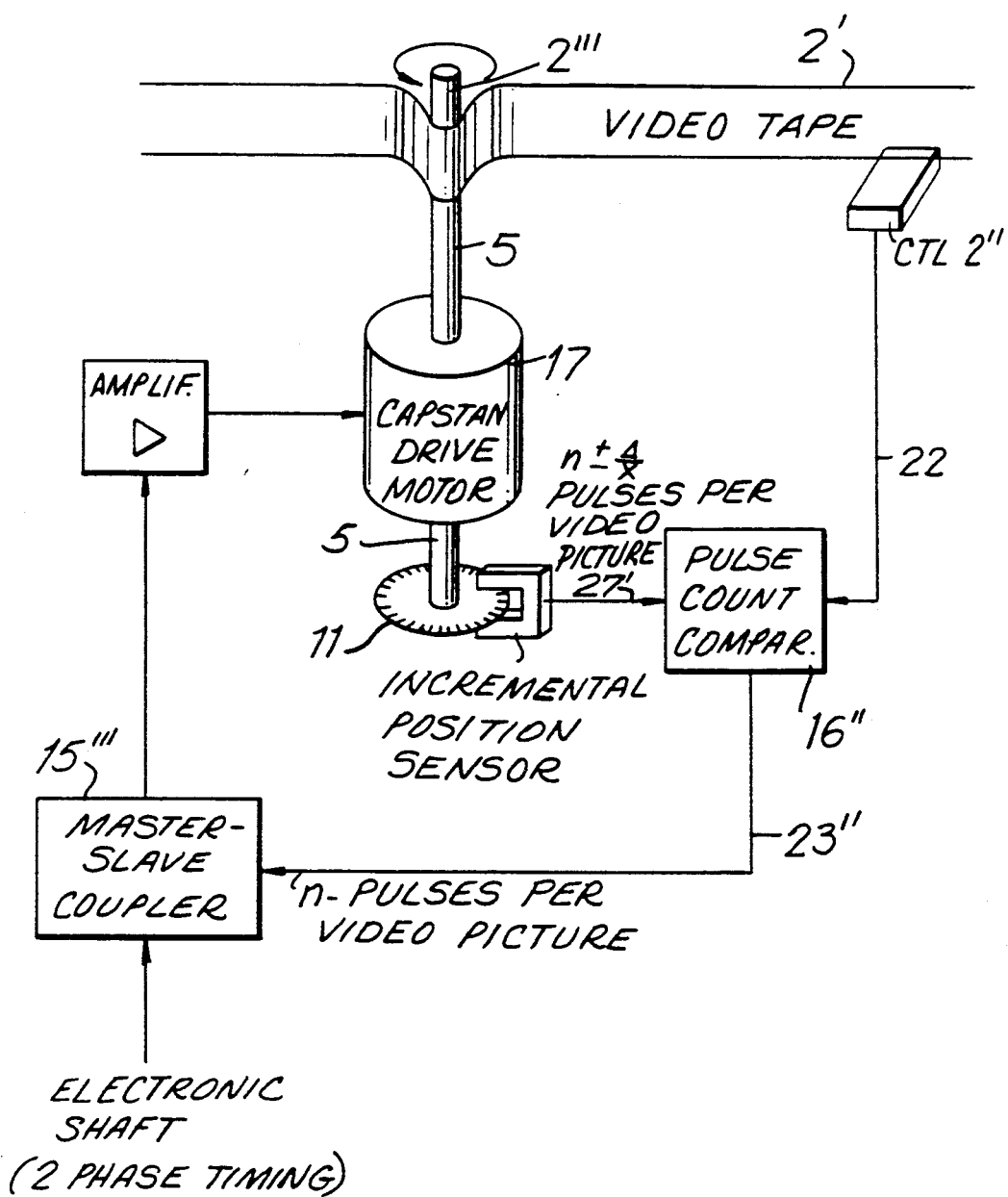
FIG. 5 is a schematic perspective view of an exemplary embodiment of an electronic slip compensating arrangement.

The closed-loop controller 16 receives control pulses 22 either from the video tape drive or from a video tape position sensor CTL. The control pulses 22 are correlated either to the standard scanning pattern components of the video signal or to position markings which can be automatically recorded on the tape 20' during the recording of the video signal. The standard position control signal corresponds to one control pulse per a video frame or picture, and represents an actual position of the video tape 2' relative to the capstan drive 2''' at the free end of the main drive coupled shaft 5 (FIGS. 4 and 5). At the same time, the controller 16, which can be constructed either as a pulse-phase comparator 16' (FIG. 4) or as a pulse count comparator 16'' (FIG. 5) receives desired position signals 27 from the incremental position sensor or detector 11 secured to the part of the main shaft 5 which is rigidly connected with the main drive 10 and the separate drives 3 and/or 6 for the sound and/or picture film tapes. Preferably, the separate drives 3 and 6 are sprocket-type drives so that no slippage of the film tape can occur. The markings on the incremental position sensor correspond to perforations or other position markings which can be automatically recorded on the separate audio- and/or picture film tapes 4, 4n and/or 7, 7n. The controller 16 compares the phase of the actual and desired position pulses 22 and 27, and the resulting deviation or error signal is fed via line 23 into the final controlling device 15 which corrects via the top part 5' or 18 of the drive shaft the position of the video tape 2' so as to achieve an accurate synchronization with the separate drives 3, 3n and 6, 6n. The cooperation of the driving arrangement 2 with these external components is indicated by lines 30, 31 in FIG. 2.

Figure 3:
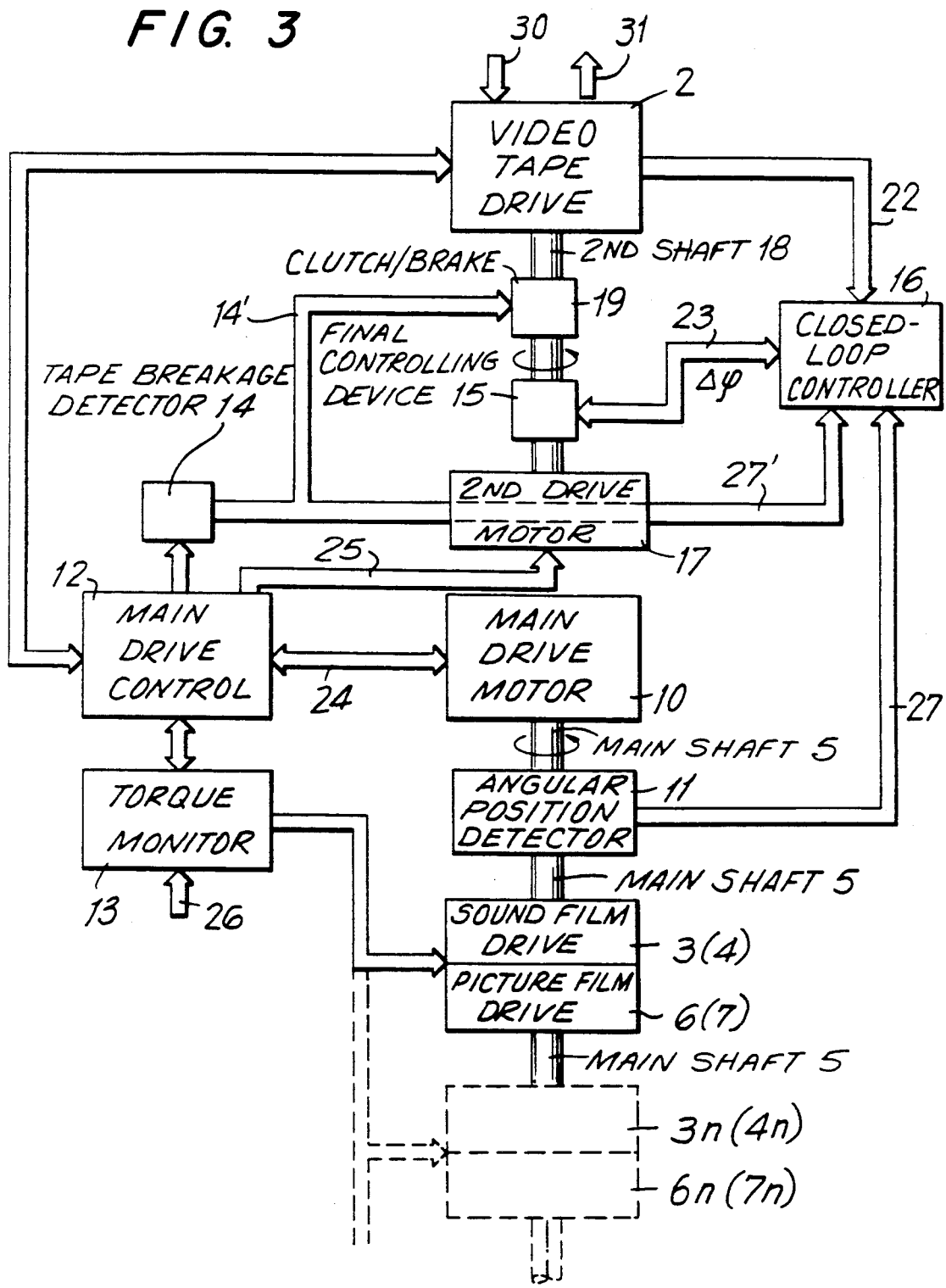
FIG. 3 is a schematic illustration similar to FIG. 2 showing the apparatus with separated mechanical connections between the driving devices for video tapes and picture/sound film tapes.

The embodiment of the inventive apparatus 1 as shown in FIG. 3 comprises essentially the same basic components as that of FIG. 2, namely a rigid drive coupled connection 5 between the main drive unit 10 and the arrangement 3 for driving the separate sound track 4 and the arrangement 6 for driving the separate image track 7, and has a second drive coupled connection 18 which is separated from the connection 5 and is arranged between a separate second drive unit 17 and the arrangement 2 for driving the video tape. The second drive coupled connection 18 is rigidly developed and cooperates with the main drive unit 10 via the main drive control or regulating unit 12 electrically connected between the unit 10 and the separate second drive unit 17, as indicated by control lines 24, 25. By suitable control of the separate drive unit 17 which may include one or more separated motors, a synchronism between all driving arrangements is obtained.

Provided that the final controlling device 15, the closed-loop regulating device or controller 16 as well as the rotary speed or angular position detecting device 11, which have been explained with respect to FIG. 2, are used in the embodiment of FIG. 3, the separate drive coupled connection 18 need not be rigid in order to provide accurate synchronism between the driving arrangement 2 and the remaining driving arrangements 3, 3n and 6, 6n.

In the embodiments shown in FIGS. 2 and 3, it is also possible to connect the main drive unit 10 with the driving arrangement 2 for driving the video tape 2' via the drive coupled connection 5 in such a manner that the main drive unit 10 is connected via the connection 5 with the brake and clutch device 19, the incremental angular position detecting device 11, the final controlling device 15 and via the intermediate gear 20 with the driving arrangement 2. The control functions are analogous to those as explained in the previous embodiments.

Although for reasons of simplicity the sound tracks 4, 4n have been described as one-channel information carriers, it is conceivable to use separate sound tracks 4, 4n which are subdivided into an arbitrary number of sound channels. In the embodiments of FIGS. 4 and 5, both the sound tracks 4, 4n and 7, 7n are in the form of perforated film tapes driven by corresponding sprocket-type driving arrangements 3, 3n and 6, 6n.

The video tape as referred to in the specification has usually no perforation. However, it is to be noted that perforated video tapes can be used in the apparatus according to the invention. Such perforated video tapes are usually known as "video films". The perforation of these video films can be arranged either along the upper film edge or along the lower film edge, or along the both edges in a known manner.

The perforated as well as the non-perforated sound and image video tape as used in the apparatus according to the invention can comprise one or more sound channels in addition to the image channel.

It will be understood that each of the elements described above, or two or more together, may also find a useful application in other types of apparatus for assembling of video tapes, differing from the types described above.

While the invention has been illustrated and described as embodied in an apparatus for assembling video tapes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An apparatus for assembling audio and video tapes in editing tapes, comprising at least one device for driving a video tape which issues synchronization signals; at least one picture film drive and at least one sound film drive; a main drive device; drive coupling means including a main shaft driven by said main drive device to provide a synchronous run of said video tape, said picture film and said sound film relative to each other under operational conditions which include standstill, positive acceleration, uniform tape speed and negative acceleration, said drive coupling means commonly driving said device for driving a video tape, said picture film drive and said sound film drive; an angular position detecting device connected to said main shaft between said main drive device and said sound film drive to issue respective angular position signals; a final controlling device coupled to said main shaft between said main drive device and said device for driving the video tape; a closed-loop controller for receiving and phase-comparing said synchronization signals from said device for driving the video tape and respective signals from said position detecting device and issuing control signals to the final controlling device so that the difference between the position of the video tape in device and the picture film and sound film drives, respectively, are kept to a minimum, thus compensating for the mechanical slip of the video tape.

2. Apparatus as defined in claim 1, wherein the drive coupling means includes a non-rigid mechanical connection to at least one of the individual drives.

3. Apparatus as defined in claim 1, wherein said drive coupling means includes an intermediate transmission gear arrangement connecting the main drive device and the at least one device for driving the video tape.

4. Apparatus as defined in claim 1, wherein said drive coupling means includes a brake/clutch device and an intermediate transmission gear arrangement.

* * * * *